United States Patent [19]

Thomas et al.

[11] 4,176,809
[45] Dec. 4, 1979

[54] ACCELERATION-SENSITIVE DEVICE

[75] Inventors: Rudy Thomas, Concord, Tenn.; Fred F. Neumann, Rochester, Mich.

[73] Assignee: N.V. Klippan S.A., Haasrode, Belgium

[21] Appl. No.: 915,695

[22] Filed: Jun. 15, 1978

[30] Foreign Application Priority Data

Jul. 9, 1977 [DE] Fed. Rep. of Germany ....... 2731072

[51] Int. Cl.$^2$ ...................... A62B 35/02; B65H 75/48
[52] U.S. Cl. .............................................. 242/107.4 A
[58] Field of Search ................. 242/107.4 R, 107.4 E; 297/388; 280/744–747; 180/82 C; 188/135–139

[56] References Cited

U.S. PATENT DOCUMENTS

| 3,901,461 | 8/1975 | Stephenson et al. | 242/107.4 A |
| 4,050,644 | 9/1977 | Fohl | 242/107.4 A |
| 4,065,071 | 12/1977 | Holmberg | 242/107.4 A |
| 4,087,059 | 5/1978 | Lindblad | 242/107.4 A |

Primary Examiner—Harvey C. Hornsby
Assistant Examiner—John M. Jillions
Attorney, Agent, or Firm—Roger H. Criss

[57] ABSTRACT

An acceleration-sensitive device, particularly a seat belt retractor locking device responsive to vehicle acceleration, comprising a rollable, fully movable inertia member supported in a depression provided in a support member, and an actuator means disposed above the inertia member and engageable with a locking means provided in said device, the actuator means being provided with a depression facing the inertia member, the improvement comprising the depression on the support member and the depression on the actuator means being in the form of a ring facing towards the inertia member, the inertia member having an approximately spherical shape, and the support member extending laterally outside its ring in an upwards direction so as to at least partially surround the inertia member.

7 Claims, 5 Drawing Figures

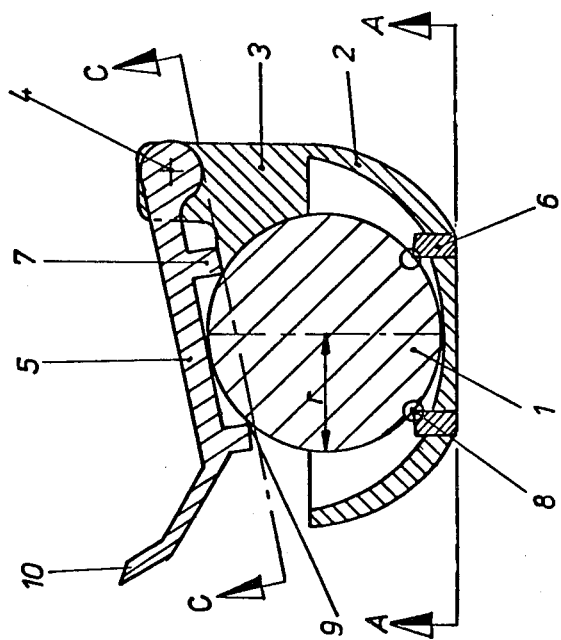
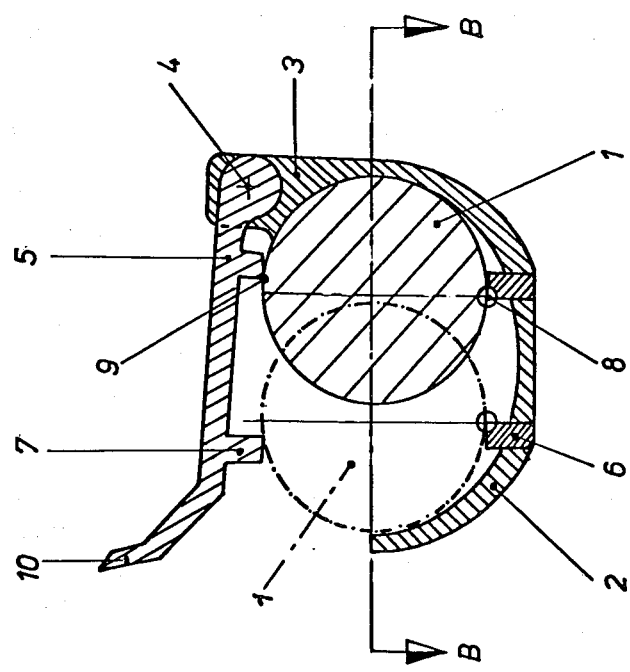

C-C

B-B

A-A

ACCELERATION-SENSITIVE DEVICE

BACKGROUND OF THE INVENTION

1. Field of the Invention

The invention relates to an acceleration-sensitive locking device and more particularly to a safety belt retractor locking device responsive to vehicle acceleration, of the type including a rollable, freely movable inertia member supported in a depression by a supporting member, and a pawl disposed above the inertia member and engageable with a locking wheel, the pawl being provided with a depression facing the inertia member.

2. Description of the Prior Art

A similar belt retractor with a locking device, disclosed in U.S. Pat. No. 3,901,461, contains as the inertia member a freely movable sphere supported in a depression, the surface of the sphere being in contact with a depression-containing extension of a locking wheel. In the event of an accident, in which the vehicle and, hence, the belt retractor is subjected to impact, the sphere moves relative to the depressions thereby pressing the pawl into engagement with the locking wheel.

Many other inertia members are also known which contain a pendulum responsive to changes in velocity. In all these belt retractors, the pawl-engaging process frequently is too slow, because the pawl enters the opening between the two teeth of the locking wheel too slowly. The time needed for the engaging process to occur is frequently similar in length to the time needed by the locking wheel to advance the distance of one tooth. In this manner, the pawl can skip over the locking wheel in ratchetlike fashion without entering into locking engagement, thus markedly decreasing reliability.

The known locking devices of this type have the drawback that they either have excessive space requirements or they do not provide enough freedom of movement for the inertia member which, for example, is spherical in shape. Most known devices also show an undesirable dependence on the character of the surface on which the sphere rolls or in which the pendulum-supporting member swings.

It would be desirable to eliminate these drawbacks by improving the locking device of the aforementioned type by minimizing the zone of uncertain engagement between the pawl and the locking wheel, providing a favorable locking position quickly and then ensuring the quick return of the inertia member to its rest position, wherein the pawl is out of engagement with the locking wheel, without expensive surface treatment of the support member.

SUMMARY OF THE INVENTION

In accordance with this invention, there is provided in an acceleration-sensitive device, preferably a seat belt retractor locking device responsive to vehicle acceleration, comprising a rollable, fully movable inertia member supported in a depression provided in a support member, and an actuator means disposed above the inertia member and engageable with a locking means provided in said device, the actuator means being provided with a depression facing the inertia member, the improvement comprising the depression on the support member and the depression on the actuator means being in the form of a ring facing towards the inertia member, the inertia member having an approximately spherical shape, and the support member extending laterally outside its ring in an upwards direction so as to at least partially surround the inertia member.

It will be understood that, from a production standpoint, the securing of the ring to the support member, on the one hand, and to the pawl, on the other, is simple and inexpensive, it being possible, for example, to form the ring by cutting narrow pieces from a pipe or tube. The inertia member need not be exactly spherical, only rollable. The production tolerances are, therefore, not particularly critical, considering that the surface of contact between the inertia member and such a ring is the internal edge of the ring. The edge, too, need not be rigorously circular as it functions smoothly even if it is slightly oval. In other words, when in the following description a sphere is mentioned in reference to the inertia member, the geometric shape of this member will be understood in a broad and not strictly geometric sense.

DESCRIPTION OF THE DRAWINGS

FIG. 1 is a vertical cross-sectional view of the locking device showing the inertia sphere in the rest position;

FIG. 2 is a similar cross-sectional view in which, however, the sphere is shown in its rest position on the right-hand side and its displaced position on the left is indicated with a broken line;

DESCRIPTION OF THE PREFERRED EMBODIMENTS

Figure 5:
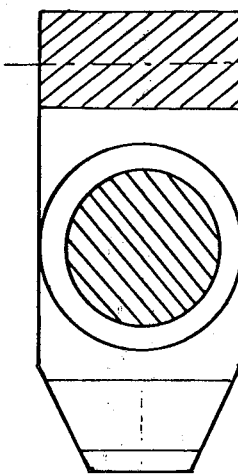
FIG. 5 is a partial cross-sectional view of the pawl taken from below, i.e., as seen from the direction of the sphere, along line C—C of FIG. 1.

In the position of rest, namely when the vehicle is in approximately horizontal position on a normal road, the sphere rests on the internal edge of the ring on the support member. On the opposite side of the sphere, only the pawl is pivotably disposed, the pawl on the side thereof facing the sphere bearing another ring. In the rest position, the approximately circular internal edge of the other ring is at the top of the sphere. The pawl is then out of engagement with the locking wheel.

When the vehicle is subjected to an acceleration in any other direction, the sphere rolls out of the ring on the support member laterally, and, through the interaction between the top side of the sphere and the ring on the pawl, lifts the pawl, thus urging the pawl into engagement with the toothed locking wheel as a result of which the belt retractor is blocked in the desired manner.

Another advantage of the invention lies in the fact that the support member is provided with an upwardly opening cup the height of which is approximately equal to the radius of the inertia sphere. This cup provides a support member of tub-like shape so that the sphere is always contained within this tub or cup, both in the rest and in the engaged position. In the rest position, the sphere does not come in contact with the upper lateral surfaces of the cup whereas in the engaged position it does. This provides the advantage that the sphere cannot be pushed out of its rest position to just any distance and ensures the quick return of the sphere to the rest position, as desired.

It is also advantageous that the diameter of the cup at the upper, open side thereof is somewhat smaller than three times the radius of the sphere. It is surprising that as a result, even in the event of an accident, the sphere can be displaced out of its rest position at the most only to a distance such that the center of gravity thereof still lies above or within the contact edge of the ring on the support member. The distance to which the sphere can move is thus sufficiently limited so that while, on the one hand, the pawl will reliably engage the locking wheel, on the other, in the absence of acceleration forces that induce locking, the sphere will immediately fall back into the rest position, without ineffectively rolling back and forth.

Another advantage of the invention lies in the fact that the pawl is secured to a lateral projection provided on the support member, its pivot axis being parallel to the plane containing the upper, open end of the cup. In itself, such positioning of the pivot axis is also featured in known locking devices.

Shaping the support member, as described hereinabove, as a tub or cup that extends to a level high enough for the plane containing the upper edge of the cup to pass approximately through the center of the sphere when said sphere is in its displaced position, with the pivot axis being disposed at a distance from the sphere and parallel to the plane and at the same time being secured in technically simple fashion to the support member, provides a very simple yet surprisingly operable actuating device.

With respect to the drawings, inertia sphere 1 rests on cup-shaped support member 2 which laterally extends upward in the direction of sphere 1 partially surrounding the sphere, said support member being provided on its side with a projection 3 through which passes the pivot axis 4 of the pawl. Pivot axis 4 of pawl 5 is disposed at a distance from and parallel to a plane passing through the upper, open end of cup-shaped support member 2 approximately at the level of line B—B of FIG. 2, and, moreover, it is parallel to the axis of rotation of the locking wheel (not shown) the teeth of which can be engaged by pawl 5.

In the center of the bottom of support member 2 is provided a ring 6 made, for example, by cutting a section from a pipe or tube of suitable diameter and securing the section to support member 2 by welding or by any suitable manner.

On its side facing sphere 1, pawl 5 bears a corresponding ring 7 the diameter of which may, but must not necessarily, equal that of ring 6.

Figure 4:
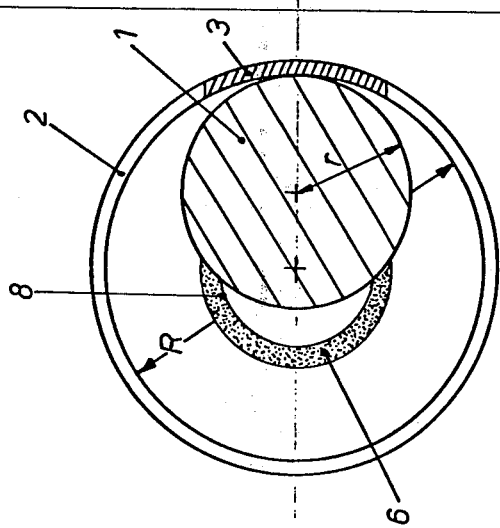
FIG. 4 is a cross-sectional view taken along the plane passing through line B—B of FIG. 2.
Figure 3:
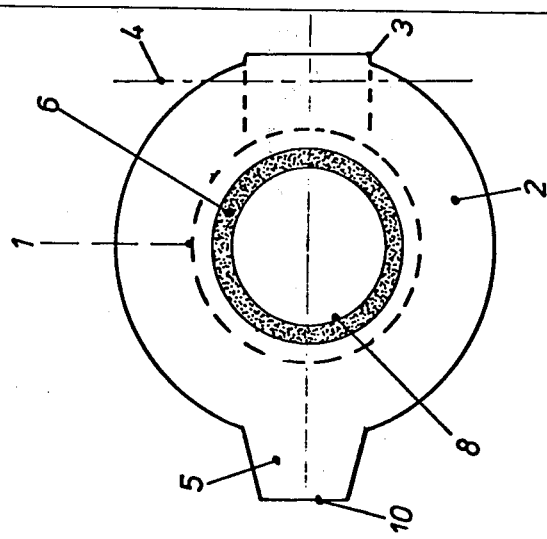
FIG. 3 is a view of FIG. 1 taken from below along line A—A of FIG. 1.

As can be seen, both in its rest position shown in FIGS. 1 and 3 and in the displaced position shown in FIGS. 2 and 4, sphere 1 rests on internal edge 8 of ring 6. In FIG. 2, the broken line passing through sphere 1 and also through the center and thus through the center of gravity of the sphere, show very clearly that the center of gravity lies above and within the inner edge 8 of ring 6. This is ensured by the fact that the diameter R of the upper, open side of cup-shaped support member 2 is somewhat less than three times the radius r of sphere 1.

FIG. 5 shows a preferred embodiment wherein internal edge 9 of upper ring 7 provided on pawl 5 also acts as a support for sphere 1.

In the rest position, namely while the vehicle is moving over an approximately horizontal road, the actuating device is in the form and state depicted in FIGS. 1 and 3. As can be seen, the plane passing through the lower, free end of upper ring 7, approximately along line C—C of FIG. 1, forms an angle with the plane passing through the upper, open end of the cup-shaped support member 2, i.e., along line B—B of FIG. 2. Thus, depending on the position of pivot axis 4, the engaging end 10 of pawl 5 may be in a downwardly retracted position, namely out of engagement with the teeth (not shown) of the locking wheel (also not shown).

In the event of a collision or some other backward movement imparting an acceleration to the vehicle, the response of inertial sphere 1 to this acceleration will be somewhat delayed. For example, if the impact occurs from the right-hand side in FIGS. 1 and 2, sphere 1 will move into the right-hand position in FIG. 2. Sphere 1 will thus roll on top of the right-hand half of internal edge 8 of ring 6 and engage internal edge 9 of ring 7 on pawl 5 thus lifting the pawl and urging the outer engagement end 10 of pawl 5 into engagement with the teeth of the locking wheel. This engagement position is also shown in FIG. 4.

As soon as the acceleration subsides, sphere 1 will very quickly fall back into the rest position shown in FIGS. 1 and 3.

It is is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. In an acceleration-sensitive device comprising a rollable, freely movable inertia member supported in a depression provided in a support member, and an actuator means disposed above said inertia member and engageable with a locking means provided in said device, said actuator means being provided with a depression facing said inertia member, the improvement comprising said depression (6) on said support member (2) and said depression (7) on said actuator means (2) being in the form of a ring facing towards said inertia member (1), said inertia member having an approximately spherical shape, each of said rings having inner and outer circumferential edges, said inertia member being normally in contact with said inner edges, and said support member (2) extending laterally outside its ring (6) in an upwards direction so as to at least partially surround said inertia member (1).

2. The device of claim 1 wherein said device is a seat belt retractor locking device responsive to vehicle acceleration and adapted for use with safety belts.

3. The device of claim 2 wherein said actuating means comprises a pawl (5) and said locking means comprises a ratchet wheel, said pawl being movable into engagement with said ratchet wheel upon actuation of said inertia member (1).

4. The device of claim 3 wherein said support member (2) is in the form of an upwardly open cup, the height of which equals the radius (r) of the inertia member (1).

5. The device of claim 4 wherein the diameter (R) of the cup (2) at its upper, open side is less than three times the radius (r) of the inertia member (1).

6. The device of claim 5 wherein the pawl (5) is pivotably mounted to a lateral projection (3) provided on said support member (2), the pivot axis (4) of pawl (5)

being parallel to the plane containing the upper, open end of the cup (2).

7. The device of claim 2 wherein said support member (2) is in the form of an upwardly open cup having an open end, and wherein the plane passing through the free end of said ring (7) of said actuator means forms an angle with the plane passing through the open end of said cup.

* * * * *